United States Patent [19]
Davidson

[11] Patent Number: 4,936,142
[45] Date of Patent: Jun. 26, 1990

[54] RAPIDLY RESPONDING VERTICAL SPEED INDICATOR FOR USE IN AIRCRAFT

[75] Inventor: Eldon F. Davidson, 240 Flower Dr., Folsom, Calif. 95630

[73] Assignees: Eldon F. Davidson, Folsom; Wayne C. Clemens, Santa Ana, both of Calif.

[21] Appl. No.: 203,472

[22] Filed: Jun. 6, 1988

[51] Int. Cl.⁵ .................. G01C 21/00; G01C 5/06; G01P 3/62
[52] U.S. Cl. ........................................ 73/179
[58] Field of Search ............. 73/178 T, 178 H, 179; 364/565, 558, 179, 575, 734

[56] References Cited

U.S. PATENT DOCUMENTS

| | | | |
|---|---|---|---|
| 3,321,968 | 5/1967 | Joline | 73/179 |
| 3,374,671 | 3/1968 | Williams et al. | 73/179 |
| 3,572,115 | 3/1971 | Fuer | 73/179 |
| 3,683,690 | 8/1972 | Anderson, Jr. | 73/179 |
| 3,703,828 | 11/1972 | Bullard et al. | 73/179 |
| 3,769,827 | 11/1973 | Moore | 73/938 |
| 3,885,430 | 5/1975 | Greene | 73/179 |
| 3,961,272 | 6/1976 | Witriol et al. | 73/179 |
| 4,086,810 | 5/1978 | Ball | 73/179 |
| 4,238,791 | 12/1980 | Wiebalck | 340/825.37 |
| 4,331,032 | 5/1982 | Sicre | 73/179 |
| 4,539,843 | 9/1985 | Wise | 73/179 |

Primary Examiner—Stewart J. Levy
Assistant Examiner—Robert P. Bell
Attorney, Agent, or Firm—Peter L. Michaelson

[57] ABSTRACT

A vertical speed indicator uses a substantially rigid hollow closed air chamber; a capillary tube having a reduced inside diameter connected to the chamber for routing atmospheric air from an aircraft static system at a reduced flow rate into the chamber; a differential pressure transducer having two inlet ports; a pneumatic conduit connecting the chamber and one of the ports of the transducer for exposing that port to internal chamber air pressure; a pneumatic conduit connected to the other port for exposing that port to atmospheric pressure occurring within the static system; and electronic processing circuitry connected to the transducer for providing an indication of the vertical speed of the aircraft. The processing circuit first compensates the signal by varying its phase in a leading direction to at least offset any pneumatic induced lag occurring in the inventive VSI, and then amplifies and displays the result on a zero center analog meter or digitizes it for subsequent use by other airborne avionic systems. Alternatively, the compensated signal can be digitally averaged over a pre-defined time period to remove random noise and similar effects. The period of time over which a digital average is produced can be lengthened to eliminate adverse effects of unstable air or thermals occurring during climb out.

14 Claims, 6 Drawing Sheets

RAPIDLY RESPONDING VERTICAL SPEED INDICATOR FOR USE IN AIRCRAFT

BACKGROUND OF THE INVENTION

1. Field of the Invention

This invention relates to a vertical speed indicator, particularly suited for use in aircraft, that is relatively inexpensive, accurate and has a sufficiently rapid response time.

2. Description of the Prior Art

In modern day aviation, aircraft pilots need an instrument that indicates whether an aircraft is ascending or descending and the vertical speed at which this occurs. While such an instrument provides valuable assistance to a pilot during flight under visual flight rule (VFR) conditions where visibility is usually good, this instrument is essential whenever the pilot flies under instrument conditions (instrument flight rules—IFR) where visibility may be marginal or even non-existent.

In most aircraft and specifically for purposes of redundancy, vertical speed information is provided through two independent flight instruments: an artificial horizon and a vertical speed indicator (VSI). The artificial horizon, in its simplest form, is a gyroscopic based device that provides the pilot with visual information regarding the attitude (pitch and roll) of his aircraft with respect to the earth's horizon. The artificial horizon contains an horizon indicator which typically forms part of a gimballed gyroscope and generally remains in a fixed position with respect to the earth's horizon while the aircraft is in motion. The horizon indicator is frequently divided into two areas: illustratively a light blue upper area representing the earth's atmosphere and a differently colored, illustratively black, lower area representing the earth's surface with the horizon being the border between both areas. A marker representing an aircraft itself is secured to the instrument panel of the aircraft and is located in front of the horizon indicator. Inasmuch as the horizon indicator freely moves with respect to the marker, the indicator visually depicts the position of the horizon with respect to the aircraft at any given time. If the aircraft is climbing, then the horizon indicator rotates downward such that the marker is in front of the blue area. Similarly, if the aircraft is descending, then the horizon rotates upward such that the marker is in front of the other area. While the horizon indicator provides valuable attitude information, it only provides a coarse pitch indication typically in degrees up or down from the horizon. Unfortunately, the artificial horizon does not provide a numeric value of the vertical speed of the aircraft.

To obtain a numeric value of vertical speed, a pilot must turn to the VSI. The VSI is not a gyroscopic device. Instead, most VSIs that are in use today are rather simple mechanical devices that essentially rely on an aneroid chamber that has a diaphragm connected to an indicating needle. Specifically, a static line is connected to one end of the chamber through a relatively small bleed hole, thin tube or capillary that provides a relatively high pneumatic resistance. The remainder of the chamber is airtight. Static pressure surrounds the outside of the chamber. As a result of this arrangement, the pressure of the air that impinges on the outside of the chamber changes much faster than does the pressure of the air situated within the chamber. The resulting differential pressure between the static pressure and the chamber pressure is directly related to vertical speed. To measure this pressure, the moveable diaphragm is frequently employed as one wall of the chamber and is connected through a mechanical coupling, such as an arrangement of gears and levers, to an indicating needle set against a zero centered gauge marked in units of feet per minute (fpm). Now, in use, whenever an aircraft is in level flight, the air pressure in the chamber equals the air pressure in the static line. As such, the moveable diaphragm remains in its neutral position, thereby causing the VSI to indicate a vertical speed of zero fpm. Alternatively, if the aircraft is ascending, then the pressure in the static line correspondingly decreases but the pressure in the aneroid chamber, due to the limited amount of air that can pass through the small bleed hole at any instant, decreases less rapidly than that in the static line. As such, the relatively high pressure in the chamber causes the chamber to expand thereby distending the flexible diaphragm outward from its neutral point and away from the chamber. This movement, amplified by the mechanical coupling, causes the needle to indicate an upward vertical speed. Now, if the aircraft is descending, then the static pressure increases while the pressure inside the chamber does not increase as rapidly due to the existence of the small bleed hole. Consequently, the relatively low pressure in the chamber causes the chamber to contract thereby distending the flexible diaphragm inward from its neutral point towards the chamber. This movement, amplified by the mechanical coupling, causes the needle to indicate an downward vertical speed. Clearly, if the aircraft maintains a steady climb or descent, i.e. at a constant vertical speed, then the pressure difference between the inside of the chamber and the static line stabilizes at a corresponding value thereby causing the needle to indicate a constant vertical speed.

In practice, a period of time typically ranging between 0.5 to 1.5 seconds is required for the chamber pressure to stabilize in aneroid based VSIs. This means that for between 0.5 to 1.5 seconds after a climb or dive has ceased, an based VSI will still be indicating non-zero vertical movement. Hence, if a pilot relied solely on a VSI reading, then the time lag would cause the pilot to over control the aircraft thereby causing it to oscillate about a desired altitude. As such, pilots realize that they can not rely solely on the reading provided by an aneroid based VSI to maintain their aircraft in level flight. Specifically, experienced pilots, typically those with several thousands of flight hours, encounter great difficulty in keeping their aircraft perfectly level during certain maneuvers, such as illustratively procedure turns, based on a VSI reading alone.

Moreover, quite apart from any pressure differences occurring between the static pressure and the chamber pressure, the flexible diaphragm can move simply as the result of gravitational and other forces (e.g. centripetal and centrifugal) exerted on VSI whenever the aircraft is making a turn, such as a sharp turn, or during a dive or climb particularly while the aircraft is accelerating. As a result, the force induced movement of the diaphragm erroneously corrupts the vertical speed indication produced by the VSI. Additional errors occur, particularly in level flight, due to essentially random noise-like variations in the static line pressure. These variations produce small erratic pressure differences within the VSI and hence erratic vertical speed indications during level flight. Although, over time, an experienced pilot learns to recognize those situations when a VSI reading may be erroneous and then mentally correct the reading accordingly, these acts do increase the workload of the pilot and can become burdensome, particularly during certain maneuvers, when the pilot can least afford an additional task.

Hence, in situations where loss of altitude is to be assiduously avoided, pilots can not rely on the VSI to provide sufficiently accurate and responsive vertical speed information. Unfortunately, as noted, the only other available instrument that provides pitch information is the artificial horizon, but it only provides a coarse indication of vertical speed which is often of insufficient resolution to be of much use in these situations.

Furthermore, over a prolonged period of time, the aneroid chamber in a VSI may develop leaks which reduce the accuracy of the VSI. As such, during the life of an aircraft, aneroid type VSIs may need to be replaced from time to time. Since the aneroid chamber and its mechanical coupling are expensive, initial purchase of such a VSI or its replacement can be rather costly.

Consequently, a number of attempts have occurred in the art to replace the mechanical components, including the aneroid chamber and the mechanical coupling, with a suitable inexpensive electronic device having sufficient resolution and accuracy and a sufficiently rapid response time. For various reasons, these attempts have generally proven to be unsuccessful.

One such attempt, which is directed at producing a VSI that has a relatively fast response but little variation at level flight conditions, is disclosed in U.S. Pat. No. 3,374,671 (issued to S. B. Williams et al on Mar. 26, 1968 and hereinafter referred to as the U.S. Pat. No. '671 Williams et al). Here, a vertical speed indicator (referred to as a vertical rate sensor) is described which utilizes a capacitive differential pressure transducer and an electrical compensating circuit. The transducer is formed of a dielectric housing that is bisected by a metallic diaphragm. The diaphragm is situated between a pair of symmetrically spaced apart conductive plates (electrodes) that are attached to opposite internal walls of the housing. A separate air cavity is formed between each plate and the diaphragm. One cavity is directly connected to atmospheric pressure. The other cavity is connected to the atmospheric pressure through a capillary tube, i.e. having a relatively small inside diameter and thereby providing a relatively high pneumatic resistance. Differential pressure within the housing caused by pressure changes attributable to vertical speed causes the diaphragm to move. As such, the transducer forms a differential capacitor. To detect the direction and magnitude of the movement of the diaphragm and of the vertical speed of the aircraft, both plates are magnetically coupled to an identical source of an alternating current (AC) exciting signal. This signal is also magnetically coupled to two opposite terminals of a bridge rectifier. The voltage appearing between the diaphragm and ground is amplified, then rectified using the bridge rectifier which serves as a synchronous phase detector, and thereafter applied through a suitable filter and compensating circuit as an output signal.

As long as the pressures within both cavities are the same, i.e. indicative of level flight, then the diaphragm does not move. Consequently, the voltage on the diaphragm is essentially zero. As the aircraft changes altitude, then the diaphragm will deflect away from that cavity that has a relatively high pressure and towards the other cavity that has a relatively low pressure, thereby moving towards one electrode or the other depending upon whether the aircraft is ascending or descending. In this case, the electrodes of the transducer in conjunction with the diaphragm will provide unequal amounts of capacitance which will unbalance the bridge. The phase and magnitude of the voltage appearing on the diaphragm, after being appropriately scaled, indicates the direction and magnitude of the vertical speed of the aircraft. Now, to increase the sensitivity of the transducer, the cavity of the transducer that is connected to the capillary tube is also connected to an additional chamber that provides a high acoustic capacitance. This acoustic capacitance imparts a relatively long time constant to this cavity. To compensate for this added delay, the filter and compensating circuit contains a parallel resistive-capacitive (R-C) circuit that has a pre-defined leading phase angle.

The prior art device disclosed in the U.S. Pat. No. '671 Williams et al and similar devices that rely on using a moving metallic diaphragm to implement a differential capacitor contain certain drawbacks. As such, these devices have failed to live up to expectations. First, the metallic diaphragm is subject to both gravitational forces as well as centrifugal and centripetal forces while the aircraft is in motion. These forces, singly or in combination, will tend to erroneously deflect the diaphragm and, as such, cause an erroneous vertical speed reading to occur. Second, the capacitances provided by such a device often vary for reasons that are unrelated to the deflection of the diaphragm. For example, the capacitance between the diaphragm and either electrode is a function of the spacing therebetween as well as the moisture content of the air existing therein. Since the transducer will be passing from one altitude to another, each of which may have a different moisture content, and the cavities exhaust and fill at different rates, the air contained in both cavities may have different moisture contents. Consequently, the capacitance associated with each cavity will contain an erroneous variation due to the moisture content of the air contained therein which is both unknown to the pilot and generally not easily correctable thereby corrupting the vertical speed information provided by the device.

Another prior art version of a VSI, having improved sensitivity and shortened response time, is discussed in U.S. Pat. No. 3,703,828 (issued to E. R. Bullard et al on Nov. 28, 1972 and hereinafter referred to as the U.S. Pat. No. '828 Bullard et al). This patent recognizes that the deflection of a diaphragm, such as that used in the U.S. Pat. No. '671 Williams et al, is inversely proportional, and hence non-linearly related, to the change in capacitance produced thereby. Consequently, to provide a linear relationship between diaphragm deflection and capacitance and hence vertical speed, the U.S. Pat. No. '828 Bullard et al discloses a VSI that uses dual diaphragms to eliminate the non-linear relationship between diaphragm deflection and capacitance. Unfortunately, this version, which uses metallic diaphragms and has a cavity that fills and exhausts with atmospheric air, is subject to the same drawbacks discussed above for the device disclosed in the '671 Williams patent.

Another attempt at providing an altitude change indicator, here for use in a relatively slow moving model airplane, that relies on an absolute pressure transducer, specifically using a moveable membrane, is shown in U.S. Pat. No. 4,238,791 (issued to R. Wiebalck on Dec. 9, 1980). Here, the moveable membrane is stretched across the top of a sealed air chamber and attached to a low inertia light shield that serves to partially block or unblock light from emitted from a photodiode as the altitude of the aircraft changes and the membrane correspondingly moves. The amount of light travelling past the shield is electrically differentiated and amplified to provide a signal that changes in relation to changes in aircraft altitude. Although the membrane and light shield can be fabricated from materials having a relatively small amount of inertia, these elements are nonetheless subject to erroneous movement caused by acceleration and other forces resulting from movement of a fast moving aircraft which, when differentiated, can produce significantly erroneous readings. A further prior art device that relies on the use of a moveable diaphragm (or separator) and is particularly prone to providing erroneous readings due to force induced movement of the diaphragm is disclosed in U.S. Pat. No. 3,321,968 (issued to E. S. Joline on May 30, 1967).

Another attempt at providing a VSI indicator, specifically a VSI that indicates vertical speed of an aircraft, e.g. a glider, that is attributable to vertical air movement and compensated to eliminate control surface induced aircraft movement, is disclosed in U.S. Pat. No. 4,086,810 (issued to R. H. Ball on May 2, 1978). This indicator relies on additively combining the outputs of a first absolute pressure transducer that senses altitude variations with that of a second absolute pressure transducer that senses airspeed variations to provide a resultant signal and then differentiating and then appropriately amplifying the resultant signal to provide an output signal that drives an indicator to depict rate of climb (vertical speed) of the aircraft. Unfortunately, differentiation is very sensitive to input noise. Since the transducer outputs are likely to contain noise components, then the rate of climb output signal is likely to contain significant amounts of noise. While input and/or output filtering could be added, this filtering disadvantageously slows the response time of the circuit.

Lastly, a further attempt at providing a VSI having an increased sensitivity and a shortened response time is disclosed in U.S. Pat. No. 3,769,827 (issued to A. G. Moore on Nov. 6, 1973). The VSI here utilizes two piezoelectric elements bonded to either side of a metallic diaphragm (thereby forming a "bimorph" element) that is mounted on a thin circumferential annularly shaped flexure situated within and bisecting a chamber. One side of the chamber is sealed; while, the other side is connected to a static line of an aircraft. As the altitude of the aircraft changes, the diaphragm flexes thereby causing each piezoelectric element to generate a corresponding voltage. The voltage generated by each piezoelectric element is then applied to an amplifier which provides an output responsive to the difference therebetween and hence to the vertical speed of the aircraft. Inasmuch as this device, not unlike those discussed above, relies on flexure of a metallic diaphragm, this device is also susceptible to producing erroneous readings as the result of centripetal and other forces exerted on the bimorph due to movement of the aircraft.

Therefore, a need exists in the art to provide an relatively inexpensive, accurate electronic VSI that is substantially immune to various forces (e.g. gravitational, centripetal and centrifugal) that will likely occur in the aircraft and which provides a relatively rapid response in comparison to vertical speed indicators known in the art.

SUMMARY OF THE INVENTION

Accordingly, an object of the present invention is to provide a vertical speed indicator (VSI), particularly suited for use in aircraft, that provides a vertical speed indication of sufficient accuracy within a relatively short response time.

Another object is to provide such a VSI that provides a reading that is substantially immune to various forces, e.g. gravitational, centripetal and centrifugal, that will occur in an aircraft during flight conditions.

A specific object is to provide such a VSI that does not rely on the use of a moveable diaphragm or the like.

Another object is to provide an electronic VSI.

Lastly, another object is to provide such a VSI that is relatively inexpensive.

These and other objects are accomplished in accordance with the teachings of the present invention by a vertical speed indicator which has a substantially rigid hollow closed air chamber; means, such as a capillary tube having a reduced inside diameter or a bleed hole therein, connected to the chamber for routing atmospheric air from an aircraft static system at a reduced flow rate into the chamber; a differential pressure, illustratively piezoresistive, transducer having two inlet ports; first means connected between the chamber and one of the ports of said transducer for exposing one of the ports to internal chamber air pressure; second means connected to the other one of the ports for exposing the other port to atmospheric pressure occurring within the static system; and means connected to the transducer and responsive to an electronic signal produced thereby for providing an indication of vertical speed of the aircraft.

Specifically, in accordance with a preferred embodiment of the invention, the signal produced by the pressure transducer is first compensated by varying its phase in a leading direction to at least offset any pneumatic induced lag occurring in the inventive VSI. The resulting compensated signal is then amplified and displayed on a zero center analog meter or digitized for subsequent use by other airborne avionic systems. In accordance with a variant of the preferred embodiment of the invention, the compensated signal can be digitally averaged over a pre-defined time period to remove random noise and similar effects. The digital averaging circuit periodically samples the compensated signal, generates digital representations thereof and converts each representation into a pulse series having a corresponding number of pulses. All the pulses in all the series that occur over the time period are summed and then appropriately divided to yield a digitally averaged value that is converted to an analog value and displayed.

In accordance with a feature of the invention, erratic indications of vertical speed that may occur during a climb-out, due to for example unstable air or thermals near the ground can be substantially eliminated by varying the time period. Specifically, the time period over which the digital average is generated is lengthened from a pre-defined minimum amount, illustratively 0.05 seconds, to a pre-defined maximum amount, illustratively 0.3 seconds, whenever the vertical speed varies from a minimum amount, typically 200 fpm, to a maximum amount, typically 500 fpm. This allows the inventive VSI to maintain a relatively fast averaging period for near zero vertical speeds, thereby advantageously permitting a pilot to rely on the inventive VSI alone for use in performing various maneuvers, where altitude loss is to be assiduously avoided.

BRIEF DESCRIPTION OF THE DRAWINGS

The teachings of the present invention may be fully understood by considering the following detailed description in conjunction with the accompanying drawings, in which.

To facilitate understanding, identical reference numerals have been used to denote identical elements that are common to the figures.

DETAILED DESCRIPTION

After reading the following description, those skilled in the art will clearly recognize that the inventive vertical speed indicator (VSI) can be used in any type of aircraft, regardless of whether it is a glider, airplane, helicopter or other aeronautical vehicle designed to travel through the atmosphere. For illustrative purposes, the inventive VSI will be discussed where appropriate in the context of use in a powered airplane.

To appreciate the advantages of the present invention, this discussion will first describe a conventional mechanical VSI that is typical of those currently in use and the major problems associated therewith. Thereafter, this discussion will turn to the inventive VSI.

Figure 1:
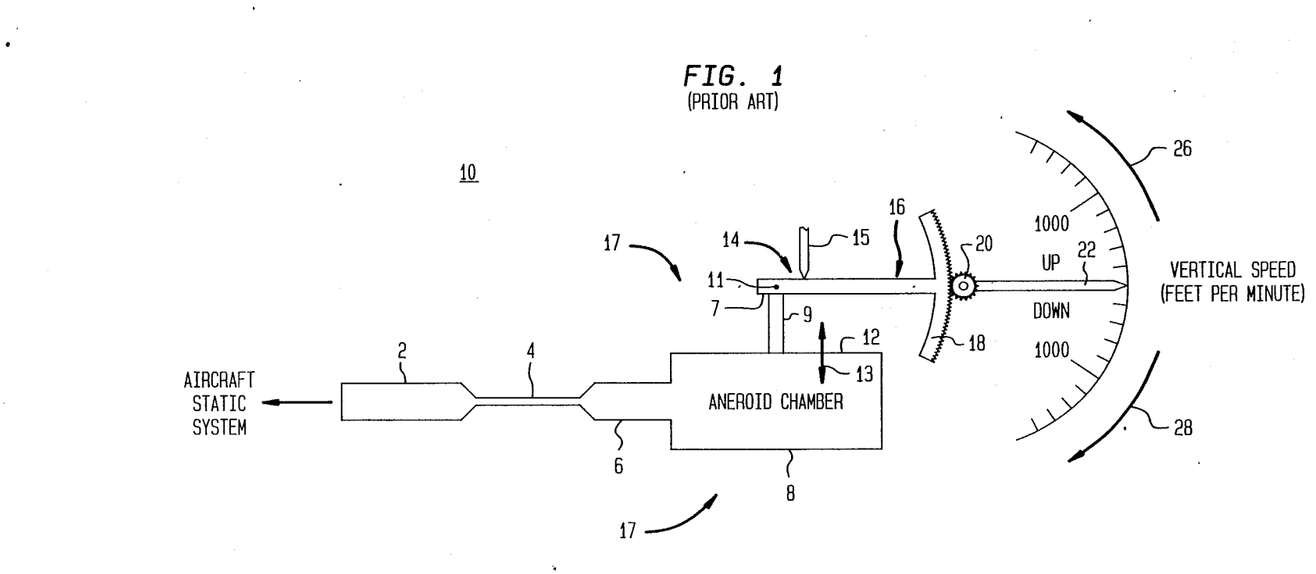
FIG. 1 is a simplified diagram of a typical prior art conventional mechanical vertical speed indicator (VSI) 10 that is commonly in use today.

FIG. 1 is a simplified diagram of mechanical aneroid chamber based VSI 10 that is typical of VSIs currently in use today. In essence, vertical speed is measured as a function of the difference in pressure between the pressure in the static system of an aircraft, i.e. atmospheric pressure at current altitude, and the pressure of the air contained within an aneroid chamber.

Specifically, VSI 10 contains aneroid chamber 8. This chamber is connected through manifold 6 to one end of capillary tube 4. This tube has an extremely small diameter and hence presents a relatively high pneumatic resistance to airflow therethrough. The other end of the capillary tube is connected through manifold 2 to the static system of the aircraft. Aside from airflow through capillary tube 4, the remainder of chamber 8 is airtight. Flexible diaphragm 12 (not specifically shown but well known) forms part of the upper surface of chamber 8. For purposes of simplicity, the mounting arrangement for the diaphragm is not shown but is nevertheless well known in the art. Static pressure, symbolized by numerals 17, surrounds the external walls of the chamber and the diaphragm.

As a result of this arrangement, the static air pressure that impinges on the outside of the chamber changes much faster than does the pressure of the air situated within the chamber. To measure the differential pressure between the static air pressure and the pressure of the air contained within the chamber, moveable diaphragm 12 forms part of the upper wall of chamber 8 and is connected through a mechanical coupling (arm 9, arm 15, lever 16, track gear 18 and rotary gear 20) to indicating needle 22 that is set against zero centered gauge 24 which is marked in units of feet per minute (fpm). Now, in use, whenever an aircraft is in level flight, the air pressure in the chamber equals the air pressure in static line. As such, the moveable diaphragm remains in its neutral position, i.e. flush with a top surface of chamber 8, thereby causing the VSI to indicate a vertical speed of zero fpm. Alternatively, if the aircraft is ascending, then the pressure in the static line correspondingly decreases but the pressure in the aneroid chamber, due to the limited airflow passing through capillary tube 4 at any instant, decreases less rapidly than the static air pressure. As such, the relatively high pressure in the chamber causes the chamber to expand thereby causing flexible diaphragm 12 to distend outward from its neutral point and away from the chamber, i.e in the upward direction indicated by double arrow 13. This movement, amplified by the mechanical coupling, causes needle 22 to rotate in the direction or arrow 26 and thereby indicate an upward vertical speed. Now, if the aircraft is descending, then the static pressure increases while the air pressure inside the chamber does not increase as rapidly due to the limited airflow passing through the capillary tube. Consequently, the relatively low pressure in chamber 8 causes the chamber to contract thereby causing flexible diaphragm 12 to distend inward from its neutral point towards the chamber, i.e in the downward direction indicated by double arrow 13. This movement, when amplified by the mechanical coupling, causes needle 22 to rotate in the direction of arrow 28 and thereby indicate an downward vertical speed. Clearly, if the aircraft maintains a steady climb or descent, i.e. at a constant vertical speed, then the pressure difference between the inside of the chamber and the static air pressure stabilizes at a corresponding value thereby causing diaphragm 12 to remain at a constant distention and, in turn, causing needle 22 to indicate a constant vertical speed. The distance through which needle 22 moves is directly proportional to the amount of distension of flexible diaphragm 12 and hence to the magnitude of the differential pressure and to the instantaneous vertical speed of the aircraft.

To translate the motion of the diaphragm into proportional deflection of needle 22, an external wall of the diaphragm is connected to needle 22 through a mechanical coupling containing arm 9, arm 15, lever 16, track gear 18 and rotary gear 20. Specifically, the external wall of diaphragm 12 is connected to one end of arm 9. The other end of this arm is pivotally coupled via hinge pin 11 to one end of moveable lever 16. Beveled edge 14 of stationary arm 15 abuts against a top surface of lever 16 and forms a fulcrum about which lever 16 can pivot. An opposite end of lever 16 is connected to elongated gear rack 18 which meshingly engages with rotary gear 20. Gear 20 is connected to needle 22. As such, as flexible diaphragm 12 moves up and down as symbolized by double arrow 13 in response to altitude changes of the aircraft, arm 9 correspondingly moves in the same direction and causes lever 16 to pivot about edge 14. Inasmuch as edge 14 is located relatively close to driven end 7 of lever 16, the movement of the lever is multiplied thereby causing a proportionally large movement of gear rack 18 in the opposite direction to that which driven end 7 of lever 16 moves. Movement of rack 18 turns rotary gear 20 to move needle 22 appropriately. Now, in operation, as diaphragm 12 moves outward or inward from its neutral point during a climb or descent, respectively, arm 9 moves the same distance up or down thereby causing gear 20 to respectively and proportionally rotate in counter-clockwise or clockwise direction to turn needle 22 to indicate the corresponding upward or downward vertical speed of the aircraft.

Conventional mechanical VSIs of the type shown in FIG. 1 contain several drawbacks which severely limit their utility. As a result, pilots, when performing various maneuvers where loss of altitude is to be assiduously avoided, can not rely on a conventional mechanical VSI of the type shown in FIG. 1 to provide sufficiently accurate and responsive vertical speed information.

First, a period of time typically ranging between 0.5 to 1.5 seconds is required for the chamber pressure to stabilize in aneroid based VSIs. Consequently, the VSI will indicate an erroneous non-zero vertical speed for between 0.5 to 1.5 seconds after a climb or dive has ceased and level flight has resumed. As a result, experienced pilots, typically those with several thousands of flight hours, encounter great difficulty in keeping their aircraft perfectly level during certain maneuvers, such as illustratively procedure turns, based on a reading produced by a conventional mechanical VSI.

Second, vertical speed readings frequently are corrupted by factors that are unrelated to aircraft altitude changes. Specifically, the flexible diaphragm used in a mechanical VSI can move in response to gravitational and other forces (e.g. centripetal and centrifugal) that are exerted on the VSI whenever an aircraft is making a turn or during a dive or climb maneuver and particularly while the aircraft is accelerating. Any force induced diaphragm movement erroneously corrupts, sometimes significantly, the vertical speed indication produced by the VSI. Additional errors occur, particularly in level flight, due to essentially random noise-like variations in the static line pressure. These variations produce small erratic pressure differences within the VSI and hence erratic vertical speed indications during level flight. Nonetheless, over time, an experienced pilot learns to recognize those situations when a conventional VSI reading may be erroneous and then mentally correct the reading accordingly. These acts do disadvantageously increase the workload of the pilot and can become burdensome at a time when the pilot can least afford an additional task. Lastly, conventional mechanical VSIs that contain an aneroid chamber and an associated mechanical coupling are typically quite expensive to initially purchase and subsequently replace.

These problems are advantageously solved by applicant's inventive electronic VSI.

Figure 2:
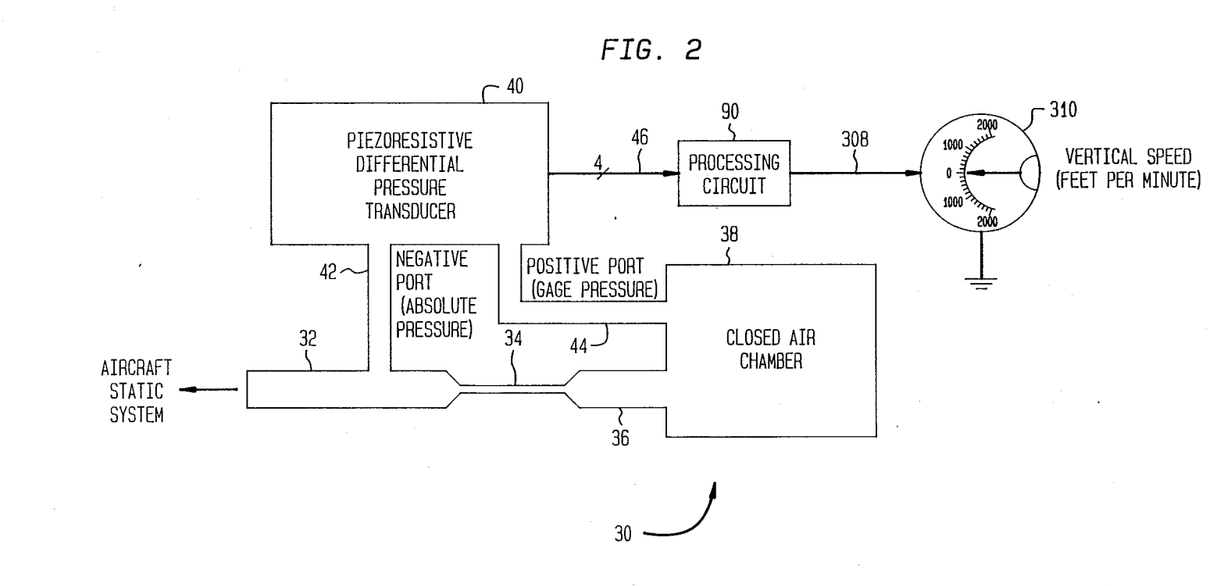
FIG. 2 is a block diagram of electronic VSI 30 that incorporates the teachings of the present invention.

FIG. 2 is a block diagram of electronic VSI 30 that incorporates the teachings of the present invention. Specifically, this VSI relies on sensing altitude changes using piezoresistive differential transducer 40. This transducer is preferably (but not limited to) Model LX06001D monolithic differential pressure transducer manufactured by Sensym, Inc. located in Sunnyvale, Calif. and is described in detail in pages 3—3 to 3—10 of the *Sensym* 1985 *Pressure Sensor Handbook* (hereinafter referred to as the *Sensym Handbook*) which is incorporated by reference herein. The output of the transducer varies linearly with differential pressure at a rate of 27.7 millivolts/ounce of differential pressure. The negative (absolute) pressure port of the transducer is connected by conduit 42 to manifold 32. This manifold, in turn, is connected to the static system of the aircraft and thereby routes static pressure to the negative port of transducer 42. Static pressure is also routed, via manifold 32 and capillary tube 34, to manifold 36. This capillary tube has a relatively small inside diameter and imparts a pneumatic resistance to airflow therethrough thereby reducing the flow rate at which air moves between the chamber and the static system. A single suitably small bleed hole contained within tubing 34 or in the wall of the chamber may be used in lieu of capillary tubing 34. Manifold (or connection) 36 routes air to hollow air chamber 38. In contrast to mechanical aneroid based VSIs known in the art and described in connection with FIG. 1, air chamber 38 is suitably rigid. As such, this chamber does not appreciably change its shape (by e.g. contraction or expansion) when a differential pressure is applied between its interior and exterior surfaces. Since no energy is mechanically stored in movement of the walls of this chamber which must be released whenever level flight is resumed—as occurs in conventional prior art aneroid VSIs, mechanical delays inherent in the inventive VSI are less than those associated with conventional aneroid based VSIs. Tubing 44 pneumatically connects chamber 38 to a positive (gage) pressure port of transducer 44. Apart from the connections of manifold 36 and tubing 44 to air chamber 38, this chamber is airtight (closed).

With this arrangement, transducer 40 generates a signal that is proportional to the difference between the static air pressure and the air pressure existing within air chamber 38. Inasmuch as capillary tube 34 restricts the flow of air entering or leaving chamber 38, static air pressure will change faster than will the air pressure existing within the chamber. The electrical output signal provided by transducer 40 is routed over leads 46 to processing circuit 90. These leads also carry power and ground connections from circuit 90 to the transducer. This circuit suitably amplifies, compensates and filters the output of the transducer into a form sufficient to appropriately drive, via lead 308, zero center meter 310. This meter has a scale marked in feet/minute.

Because a rigid air chamber is used in lieu of an aneroid chamber, the inventive VSI is expected to cost significantly less than conventional mechanical aneroid based VSIs known in the art. Specifically, first, since air chamber 38 is rigid, it does not need to be surrounded by static air pressure thereby simplifying manufacture. Second, no mechanical gauges are mechanically coupled to the chamber thereby dispensing with the need to use any moveable diaphragms and associated mechanical couplings. In addition and most important, since this chamber and the differential pressure transducer are both rigid, the inventive VSI is substantially immune to any forces, such as gravitational, centrifugal and centripetal, that occur during flight and would inject errors, through force induced motion of a moveable diaphragm, into a vertical speed reading produced by a conventional mechanical VSI.

As noted, differential pressure sensor 40 has an output of 27.7 millivolts/ounce of differential pressure. Since standard atmospheric pressure generates one ounce of differential pressure with an altitude difference of 119.42 feet, transducer 40 will generate a signal of 230 microvolts for a one foot difference in altitude. As a result of this relatively high sensitivity, a capillary tube having a larger inside diameter can be used for tubing 34 (or larger diameter bleed hole can be used) that would otherwise be employed in conventional mechanical aneroid VSIs. As such, use of a larger tube size will further advantageously reduce the time required for the reading provided by the inventive VSI to stabilize after a change in vertical speed has occurred.

Figure 3:
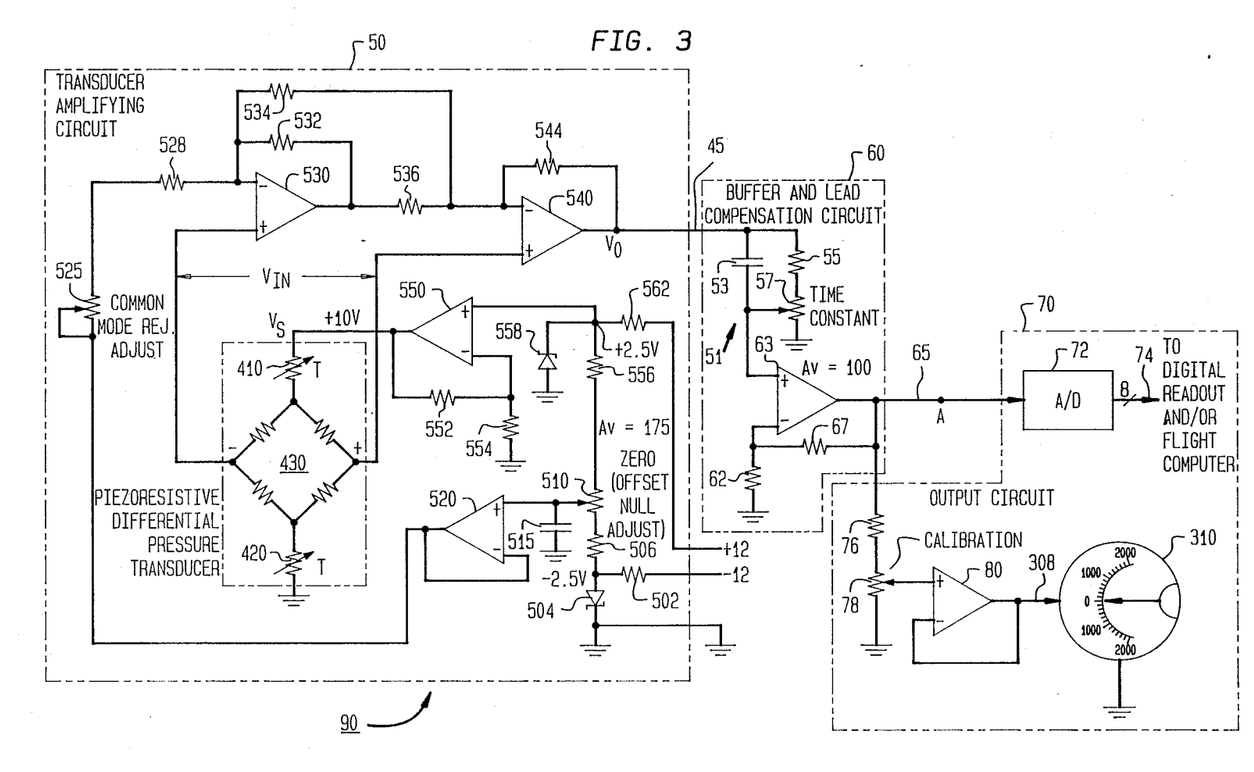
FIG. 3 is a schematic diagram of processing circuit 90 that forms part of inventive VSI 30 shown in FIG. 2.

A schematic diagram of processing circuit 90 that forms part of inventive VSI 30 shown in FIG. 2 is depicted in FIG. 3. Specifically, circuit 90 consists of transducer amplifying circuit 50, buffer and lead compensation circuit 60 and output circuit 70. Amplifying circuit 50 provides an illustrative voltage gain of 175 to the signal generated by differential pressure transducer 40. This circuit is disclosed and discussed on page 3—6 of the *Sensym Handbook*. The amplified transducer signal appears on lead 45 and is routed to buffer and lead compensation circuit 60. This circuit contains R-C network 51 formed of capacitor 53 (illustratively 68 $\mu$F), resistor 55 (illustratively 2K$\Omega$) and potentiometer 57 (illustratively 10 K$\Omega$) that can be adjusted to provide a leading phase angle to the amplified transducer signal appearing on lead 45 so as to partially offset the lag inherent in the pneumatic components of the inventive VSI and thereby further shorten the response time of the inventive VSI. The output of this network is a compensated signal. This circuit also contains amplifier 63 which amplifies the compensated signal by a voltage gain of 100, as determined by the values of resistors 62 and 67, to produce an analog vertical speed output signal. The resulting vertical speed output signal appearing on lead 65 is routed to output circuit 70. Within this circuit, analog-to-digital converter 72 converts the output signal into illustrative eight bit parallel digital form for connection to a local digital readout device, such as a series of seven segment displays using light emitting diodes, liquid crystals or gas discharge devices, and/or to a flight computer, e.g. an autopilot or flight director, for processing therein. In addition, the vertical speed output signal is also applied to a voltage divider consisting of resistor 76 and calibration potentiometer 78. The signal appearing at the output (armature) of this potentiometer is routed through unity gain non-inverting buffer amplifier 80 and lead 308 to zero center meter 310. Potentiometer 78 is adjusted to appropriately scale the maximum value of the output signal to a full scale reading of meter 310. The values of resistor 76 and potentiometer 78 are not critical. Power for circuit 90 is provided through a source of $\pm 12$ volts DC, although to simplify the drawing well known power connections to the amplifiers and other components are not shown.

Amplifying circuit 50 contains amplifiers 520, 530, 540 and 550. Zener diodes 558 and 504 in conjunction with series resistors 562 and 502 provide $\pm 2.5$ volt DC reference levels from the $\pm 12$ volt DC supply levels. Amplifier 550 multiplies the $+2.5$ volt reference level by a factor of four (through appropriate selection of the values of resistors 552 and 554) to a $+10$ volt level for use by transducer 40. This transducer is represented by its electrical circuit containing sensing bridge 430 connected in series with temperature compensating thermistors 410 and 420. The output of the transducer, $V_{IN}$, appears across the non-inverting inputs of amplifiers 530 and 540. These amplifiers provide identical gain. Resistors 532, 536 and 544 have the same non-critical value, illustratively 10K$\Omega$. Resistor 534 has a value of illustratively and approximately 120 or to impart an overall voltage gain to circuit 50 of approximately 175. Non-inverting unity gain amplifier 520 provides appropriate level shifting of the $-2.5$ volt reference level. Potentiometer 525, typically 2K$\Omega$ in value, is appropriately adjusted to impart a desired common mode rejection to circuit 50. Series resistor 528 is illustratively chosen to have a value of approximately 9K$\Omega$. Capacitor 515, typically 1 $\mu$F in value, provides filtering of the $-2.5$ volt reference level. Resistors 556 and 506, each typically 4.7 K$\Omega$, and potentiometer 510, typically 1K$\Omega$, provide an adjustable voltage divider for nulling out any offset in the output signal occurring at zero differential pressure. The values of resistors 506 and 556 and potentiometer 510 are not critical.

Now, with potentiometer 57 and potentiometer 78 adjusted to approximately mid-range, a 230 microvolt signal produced at the output of transducer 40 (as noted, for a one foot difference in altitude) will, within circuit 90, provide a signal at the armature of calibration potentiometer 78 which is adequate to produce a reading of 20% full scale on the vertical speed indicator. Thus, the inventive VSI is quite sensitive to altitude changes.

Now, with respect to the operation of R-C network 51, whenever the aircraft is in level flight, the pressure in closed air chamber 38 (see FIG. 2) and the static line pressure are equal. Hence, the amplified transducer voltage produced by amplifier 540 (see FIG. 3) and appearing on lead 45 is zero. In response to voltage changes appearing on this lead, which occur as the result of a change in altitude sensed by transducer 40, capacitor 53 being effectively wired in series with this voltage develops a voltage thereacross that is proportional to the derivative (rate of change) of these voltage changes. Resistors 55 and potentiometer 57 develop a voltage thereacross that is proportional to the voltage on lead 45. As such, the voltage applied to a summing junction of amplifier 63 contains a component proportional to the derivative of a change in altitude as well as a component proportional to the altitude change itself. Use of the derivative component is used to compensate for the pneumatic delays inherent in the inventive VSI. If the value of resistor 55 and capacitor 53, the setting of potentiometer 57 and the diameter of capillary tubing 34 (see FIG. 2) are carefully selected, then the inventive VSI provides accurate readings. However, experimentation showed that the lag in the VSI was similar in magnitude though somewhat smaller than the minimum lag (0.4–0.5 seconds) produced in a conventional mechanical VSI which, in turn, disadvantageously complicated the task for an experienced pilot of making procedure turns without gaining or losing altitude.

Through experimentation, the applicant has determined that excellent performance can be achieved if a filter which provided a delay characteristic of 0.05 second was interposed between the output of amplifier 63 and meter 310 (see FIG. 3) in lieu of buffer amplifier 80 (and its associated components). To minimize delay, applicant advantageously uses a digital averaging filter with a full scale averaging time of 0.05 seconds rather than an R-C filter having a time constant (TC) of 0.05 seconds. Inasmuch as the digital averaging filter only requires one averaging interval of 0.05 seconds to provide a full scale response from zero, while a standard R-C filter would typically require a time interval ranging from between 3–5 time constants, i.e. here 0.15–0.25 seconds, use of the digital averaging filter provides far less delay than if a standard R-C filter were to be used instead. Therefore, the displayed rate of change would advantageously contain significantly less ringing about a steady state value with use of the digital averaging filter than through use of a standard R-C filter. Consequently, an autopilot connected to applicant's inventive vertical speed indicator using a digital averaging filter would impart a substantially lessened amount of oscillatory vertical motion into the motion of the aircraft in response to a sudden unexpected altitude change than would otherwise occur using a VSI with a standard R-C filter.

Figures 4, 4A:
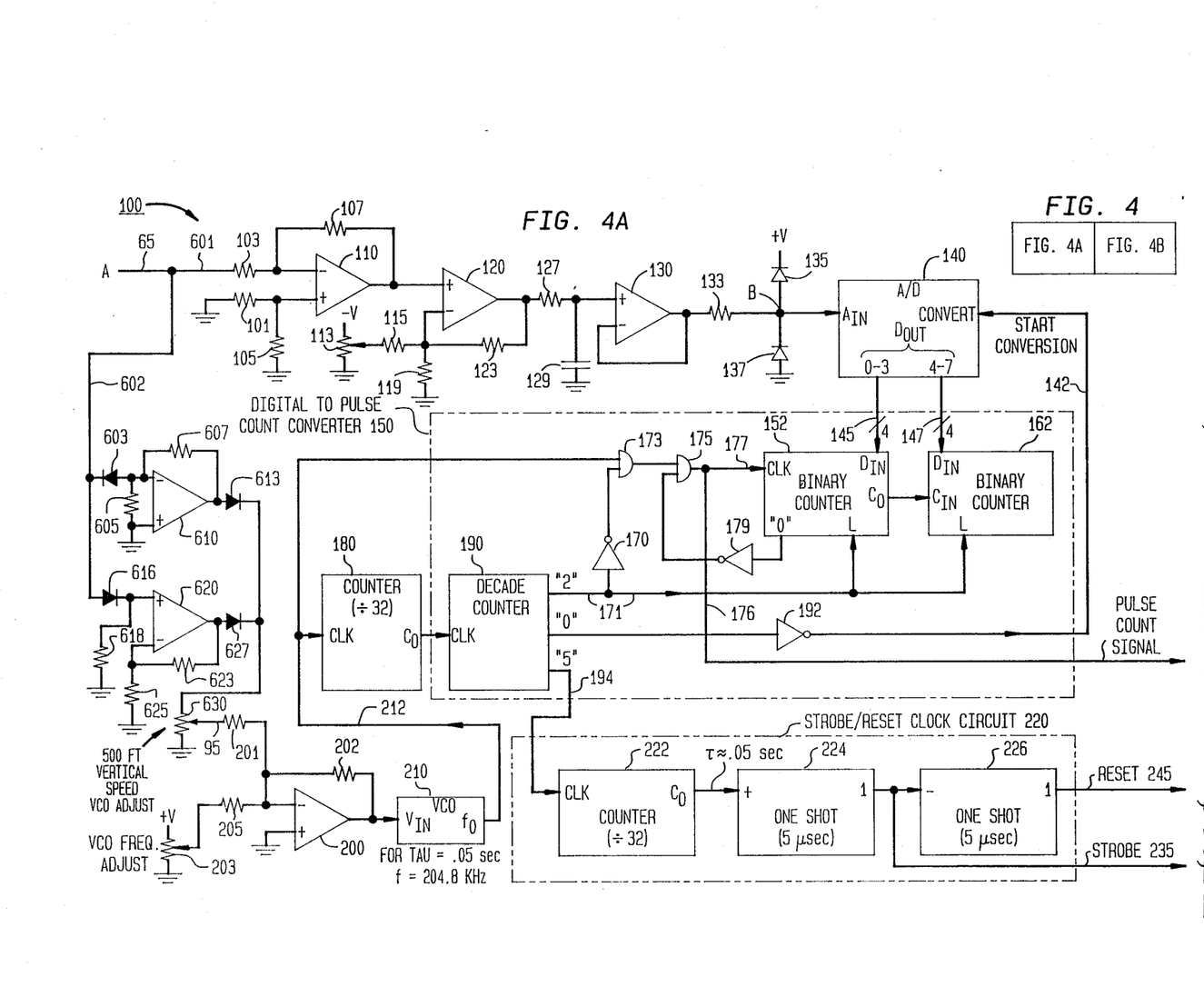
FIG. 4 shows the proper alignment of the drawing sheets for FIGS. 4A and 4B.
FIGS. 4A and 4B collectively show a block diagram of digital averaging circuit 100 that can be advantageously used in inventive VSI 30 in lieu of output circuit 70 shown in FIG. 3.
Figure 4B:
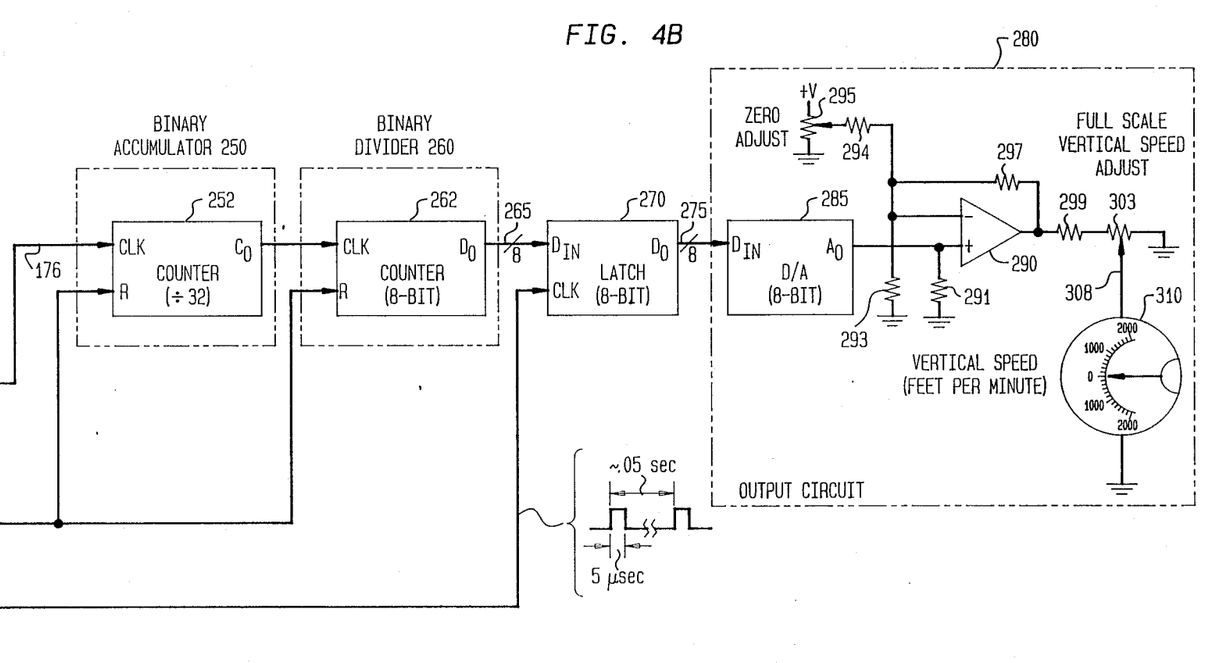

A block diagram of digital averaging circuit 100 that has been developed by the applicant, that has a 0.05 second averaging time and can be advantageously used in inventive VSI 30 in place of output circuit 70 depicted in FIG. 3 is collectively shown in FIGS. 4A and 4B—for which the proper alignment of the drawing sheets for these figures is shown in FIG. 4. Circuit 100 is connected at point A to lead 65 and is used in lieu of circuit 70.

In essence, digital averaging circuit 100 first amplifies, filters and repetitively samples the vertical speed output voltage appearing on leads 65 and 601 to provide digital representations thereof. Each digital representation is then converted by digital to pulse count converter 150 into a series of pulses wherein the value of each digital representation is encoded into the number of pulses appearing in the series. Thirty two separate pulse series occur per every 0.05 second. Thereafter, all pulses occurring in all the series are accumulated (totalized) over a 0.05 second interval by binary accumulator 250. The resulting accumulated (totalized) count is then divided by binary divider 260 to produce an average value, that is updated every 0.05 seconds, for subsequent conversion to an equivalent analog value and eventual display on meter 310. Strobe/reset clock circuit 220 produces strobe and reset pulses at 0.05 second intervals, as discussed in detail below.

Specifically, as depicted in FIGS. 4A and 4B, the vertical speed output voltage on lead 65 is applied to digital averaging circuit 100, via lead 601. Within the filter, the vertical speed voltage is applied as input to amplifier 110. From there, the resulting amplified signal is applied to the non-inverting input to amplifier 120. Together amplifiers 110 and 120 scale the vertical speed voltage appearing over lead 601 to a 0-5 volt level. A negative reference DC voltage provided by potentiometer 113 is applied through resistor 115 to the inverting input to amplifier 120. This potentiometer is appropriately adjusted such that a zero valued vertical speed voltage provides a 2.5 volt signal at point B (the analog analog/digital converter 140, as discussed below). The gain of amplifiers 110 and 120 is established by proper selection of the values of resistors 101, 103, 105, 107, 115, 119 and 123. None of these resistor values nor the value of potentiometer 113 is critical.

The 0–5 volt output signal produced by amplifier 120 is applied through a low pass filter consisting of resistor 127 and capacitor 129. The values of resistor 127 and capacitor 129 are selected, illustratively 100 KΩ and 1 μF respectively, to provide a filter, with a sufficiently low cut off frequency, here illustratively 10 Hz, that effectively removes high frequency noise from the amplified signal produced by amplifier 120. The output of this filter is applied through non-inverting buffer 130 to the analog input of analog-digital (A/D) converter 140, via a voltage limiting circuit consisting of resistor 133 and diodes 135 and 137. This limiter ensures that the analog voltage applied as input to A/D converter 140 remains within the 0–5 volt range. This converter produces a eight bit digital word having a binary value that is proportional to the 0–5 volt signal applied thereto. For example, given either a 0 or +5 volt DC input signal, the converter produces a digital word having the value 0 or 255, respectively. As discussed below, the converter performs an analog-to-digital conversion each time a pulse is applied to its CONVERT input, via start conversion lead 142. The upper and lower order four bits of the eight bit parallel word produced by A/D converter 140 are applied, in parallel via leads 145 and 147, as input to respective four bit counters 152 and 162.

Whenever, the aircraft is flying level, the vertical speed voltage appearing on input lead 601 is zero. As a result and as discussed above, a +2.5 volt DC level is applied to the analog input, $A_{in}$, of the A/D converter. The converter produces the binary value "128" at its digital output which, in turn, is applied to the data inputs, $D_{in}$, of cascaded binary counters 152 and 162, as discussed below.

Now, at the same time, voltage controlled oscillator (VCO) 210 is producing a steady stream of 102.4 kHz clock pulses. These pulses serve as the base clock for digital averaging circuit 100. The frequency of these pulses is controlled by an analog voltage applied to input $V_{in}$ of the VCO. This voltage is produced by amplifier 200 which, itself, amplifies the difference between a fixed reference voltage provided by potentiometer 203 and a 500 feet vertical speed VCO adjust potentiometer appearing on lead 95, as discussed below. For an averaging time ($t_{av}$) of 0.1 seconds at zero vertical speed, potentiometer 203 is adjusted such that VCO 210 produces a 102.4 kHz pulse train. For a 0.05 second averaging time, potentiometer 203 is adjusted such that VCO 210 produces a 204.8 kHz pulse train as its base clock rate. Since an averaging time of 0.05 seconds was empirically found to be ideal to allow procedure turns to be made without altitude change using readings provided by the inventive VSI alone, then to simplify the following discussion, the base clock rate produced by the VCO will be assumed to be 204.8 kHz to yield an averaging time of 0.05 seconds. To eliminate erratic indications that may occur during climb-out after takeoff, as discussed in detail below, the averaging time begins to increase from 0.05 seconds once the vertical speed exceeds 200 fpm and rises to a maximum value of typically 0.3 seconds for a vertical speed equal to or greater than 500 fpm. This change in averaging time occurs whenever vertical speed exceeds 200 fpm, i.e. either during a climb or descent.

Digital averaging circuit 100 utilizes several timing signals that are all related to the 204.8 kHz base clock. In particular, the signal produced by VCO 210 is first counted down by 32 by binary counter 180, and thereafter the resulting count is itself counted down by 10 by decade counter 190. Each state of the decade counter is separately decoded and is available as an output. The "0", "2" and "5" outputs are used in this embodiment. Specifically, every time a zero state occurs in counter 190 a pulse appears "0" output of this counter. Inasmuch as counters 180 and 190 together divide the 204.8 kHz clock frequency by "320", pulses appear on the "0" output of counter 190 at a frequency of approximately 640 Hz. Each of these pulses is applied to inverter 192 which inverts its state and, from there, applies the resulting inverted pulse, via lead 142, to the CONVERT input of A/D converter 140 to initiate an analog-to-digital conversion. As such, A/D conversions occur at the rate of 640 Hz.

As noted above, digital to pulse count converter 150 converts every digital value produced by A/D converter 140, and appearing on leads 145 and 147, into a series of 204.8 kHz clock pulses that appear on PULSE COUNT SIGNAL lead 176. Each digital value defines the number of pulses (pulse count) that occurs in a corresponding series. This conversion occurs every 1.5625 milliseconds (i.e. at a rate of approximately 640 Hz) to produce 640 separate series of pulses per second on lead 176. Converter 150 functions in the following manner. First, assume the count stored in counters 152 and 162 is zero. Now, with zero stored within these two counters, a high level occurs at the "0" output of counter 152. This high level is inverted by inverter 179. The resulting low level produced by this inverter is applied as one input to AND gate 175 to inhibit any 204.8 kHz clock pulses from propagating through this gate to the clock input of counter 152. Now, when the count in counter 190 advances by two (i.e. after 64 204.8 kHz clock pulses have occurred), a pulse appears on the "2" output which, in turn, is applied, via lead 171, as an input to inverter 170 and also to the load input of counters 152 and 162. As a result, this inverter produces a negative going pulse which is applied to one input of AND gate 173 in order to inhibit any 204.8 kHz clock pulses from propagating therethrough. At the same time, the positive pulse appearing on lead 171 causes the binary number produced by A/D converter 140 (illustratively having the value "128" for a zero vertical speed), and appearing on leads 145 and 147 and applied to the data inputs to counters 152 and 162, to be loaded into these two counters. Once this happens, the "0" output of counter 152 goes low, which, in turn, via the inversion produced by inverter 179, enables AND gate 175. The next clock pulse applied to counter 190 causes this counter to advance its count from "2" to "3" which results in the level appearing at the "2" output returning to a low state. This low level, when inverted by inverter 170, enables AND gate 173. Inasmuch as AND gates 173 and 175 are now enabled, 204.8 kHz clock pulses produced by VCO 210 are gated through these gates to the clock input of counter 152. These 204.8 kHz clock pulses produced by the VCO successively decrement the count (illustratively starting at the value "128") existing in counters 152 and 162 to zero. Once this count reaches zero, the "0" output of counter 152 goes positive once again to temporarily inhibit, via AND gate 175, the application of any further clock pulses to counter 152. The same 204.8 kHz clock pulses used to decrement counters 152 and 162 are also applied to PULSE COUNT SIGNAL lead 176. Thus, the signal appearing on this lead contains successively occurring series of 204.8 kHz clock pulses. Individual pulse series are produced at a frequency of 320 Hz. The digital number (0–255) produced by A/D converter 140 specifies the exact number of pulses (0–255) that occurs in a corresponding individual series of pulses.

The pulses appearing on PULSE COUNT SIGNAL lead 176 are used to increment the count stored in binary accumulator 250, which itself consists of binary divide-by-32 counter 252. This accumulator continually accumulates (totalizes) the pulses appearing on lead 176 over a pre-defined period of time, here 0.05 seconds. During this period, 32 separate pulse series will have been generated by converter 150, applied to lead 176 and totalized by counter 252. The totalized count stored in counter 252 is then averaged over the same period by binary divider 260. In particular, the pulses clocked out of counter 252 are applied to the clock input of 8-bit binary counter 262, located within divider 260, to successively increment the contents of this latter counter. The contents of counter 262 equal the remainder of the total number of pulses clocked out of counter 252 divided by the value "256". Since counter 252 divides the 204.8 kHz clock pulses by 32 to form a pulse train that is successively divided by 64 by counter 262, then after illustratively 128 pulses have been applied to the clock input of counter 252, the contents of counter 262 have been incremented to the value "4". The contents of counter 262 is applied, in parallel via leads 265, to the input of 8-bit latch 270. These contents are strobed into latch 270 every 0.05 seconds by a strobe pulse appearing on lead 235. After the strobe pulse occurs, the contents of accumulator 250 and divider 260 are both reset to zero by a reset pulse appearing on lead 245. Inasmuch as the contents of counter 262 are read in parallel at the end of the same 0.05 seconds interval during which accumulator 250 is totalizing, the contents in divider 260 equals the average value of the number of pulses that have occurred in all of the series of pulses that have appeared on lead 176 during this period. Consequently, the average value stored in divider 260 accurately represents the average value of the vertical speed voltage occurring during this period.

The value stored in latch 270 is transferred to the parallel input of D/A converter 285, which for a zero vertical speed produces a half scale error signal of +2.5 volts. The output of this converter is buffered by amplifier 290 and then applied through resistor 299 and potentiometer 303, and finally, via lead 308, to meter 310. With a zero vertical speed voltage appearing on leads 65 and 601, potentiometer 295 is adjusted to ensure that meter 310 reads zero. Alternatively, when a test signal is injected into digital averaging circuit 100 (see FIG. 3) that produces a full scale vertical speed voltage on lead 65 (see FIG. 4A), potentiometer 303 is suitably adjusted to provide a full scale deflection on meter 310. The values of resistors 291, 293, 294 and 297 are not critical and are suitably selected to set the gain for amplifier 290 to an appropriate value. The value of resistor 299 and potentiometer 303 are also not critical but depend upon the full scale current required to drive meter 310 to its maximum reading.

Strobe/reset clock circuit 220, in conjunction with decade counter 190, generates 5 microsecond strobe and reset pulses each having a 0.05 second period. To provide these pulses, a pulse produced by one of the decoded states, illustratively the "5" state of counter 190, is applied, via lead 194, as an input to binary counter 222. This counter divides the 320 Hz pulses appearing on this lead by 32 to yield one pulse that occurs every 0.05 seconds. The leading edge of this 0.05 second pulse triggers one shot (monostable multivibrator) 224 to produce a pulse that is illustratively 5 microseconds in width. This 5 microsecond pulse is applied as the strobe pulse to lead 235. Five microseconds later, the falling edge of the strobe pulse triggers one shot 226 which itself also produces a 5 microsecond pulse that is applied as the reset pulse to lead 245. Now, after the count in counter 190 is incremented by five, i.e. from the value "5" back to the value "0", the above process is repeated.

Now, as discussed, A/D converter 140 samples its analog input voltage 640 times a second and produces a binary value that is proportional to the instantaneous value of this analog voltage. As noted, if 2.5 volts (occurs with zero vertical speed) is applied as the analog input voltage to the A/D converter, this converter will produce the binary value "128" and "128" pulses will form each series of pulses that appears on PULSE COUNT SIGNAL lead 176. Similarly, if 3.75 volts (occurs with a positive vertical speed voltage, i.e. a climb condition) is applied as an analog input voltage on lead 65, then the converter will produce the value "192" and "192" pulses will form each series of pulses appearing on lead 176. Alternatively, if the analog input voltage decreased to 1.25 volts (occurs with a negative vertical speed voltage, i.e. a descent condition), then the converter will produce the value "64" and only "64" pulses will appear in each series of pulses. Now, over a 0.05 second period, the analog input voltage applied to this converter would be sampled 32 times (0.05×204.8 kHz/320). If the vertical speed voltage and hence the analog input voltage applied to the A/D converter contained an oscillatory error component having a period less than 0.05 seconds or random noise, while the true vertical speed remained at zero, then the number of times the value produced by this converter increased above and decreased below the value "128" would remain equal. Similarly, over this period, the pulse count of each series of pulses would increase above and decrease below the value "128"; however, the average value of the pulse count for all the series would remain at the value "128". As such, at the end of this 0.05 second period, the value contained in counter 262 would equal the value "128". This value, when applied via leads 275 to the input of D/A 285, will produce a steady zero indication on meter 310. Alternatively, if the aircraft gains or loses altitude (climbs or descends), then the vertical speed voltage appearing on leads 65 and 601 will be non-zero. In this case, the error or noise will be centered about a non-zero deviation signal. Hence, the average value of the signal applied to the analog input of A/D converter 140 will become non-zero as this signal tracks the non-zero average value of the vertical speed signal appearing on lead 65. Likewise, as is evident from the above discussion, the average pulse count of the pulses appearing on lead 176 and the value of the binary number produced by counter 262 will also change as well as both track the average value of the vertical speed voltage occurring over the 0.05 second period. Hence, amplifier 290 will produce an output signal that will result in either a correct upward or downward vertical speed indication on meter 310. In practice, the inventive digital averaging filter will substantially reduce, to near zero, any oscillating error signal, having a period of approximately 0.05 seconds or less, or random noise from the reading produced by meter 310.

Through flight testing, the applicant observed that at an averaging time of 0.05 seconds, the inventive VSI did exhibit some erratic indications during climb-out after takeoff. The applicant believes that these erratic indications were likely due to thermals and unstable air located near the ground but having a sufficiently long time constant to prevent its removal by the relatively short 0.05 second averaging time. As such, amplifiers 610 and 620 are utilized to increase the averaging time whenever the absolute value of the vertical speed is equal to or greater than 200 fpm, i.e. during a climb or descent, and thereby eliminate these erratic conditions but maintain a minimum averaging time for near zero vertical speeds. This assures that procedure turns and other maneuvers can be made using the inventive VSI alone without altitude changes occurring.

Specifically, the vertical speed voltage appearing on lead 65 is also routed, via lead 602, through diodes 603 and 616 to the inverting input of amplifier 610 and the non-inverting input of amplifier 620. Based upon the polarity of the vertical speed voltage, diode 603 will block the vertical speed voltage during a climb, i.e. when the vertical speed voltage is positive; while, diode 616 will block the vertical speed voltage during a descent, i.e. when the vertical speed voltage is negative. Whenever absolute value of the vertical speed voltage exceeds the value for 200 fpm, then one of the diodes, depending upon whether the vertical speed voltage is positive or negative, will begin to conduct. At this point, the associated amplifier, amplifier 610 or 620, will produce a positive voltage that will increase with further increases in vertical speed. This voltage, when applied through either diode 613 or 627, potentiometer 630 and resistor 201 drives the output of amplifier 200 negative. By doing so, the signal applied to the input of VCO 210 decreases which, in turn, reduces the frequency produced by the VCO and correspondingly increases the averaging time. As such, the averaging time proportionally increases with from a minimum amount, typically 0.05 seconds, to a maximum amount, typically 0.3 seconds, with increases in vertical speed from 200 fpm to 500 fpm. For vertical speeds in excess of 500 fpm, amplifier 610 or 620 is driven to the positive limit which, in turn, decreases the clock frequency to a lower limit to lengthen the averaging time to a predetermined maximum value. In particular, during calibration, with a simulated vertical speed in excess of 500 fpm occurring, potentiometer 630 is adjusted such that VCO 210 (for a base clock value of 204.8 kHz) produces a clock frequency of 34.133 kHz such to produce an averaging time of approximately 0.3 seconds. The values of resistors 605, 607, 618, 623 and 625 are not critical and are chosen to provide amplifiers 610 and 620 with appropriate gain factors.

Figure 5:
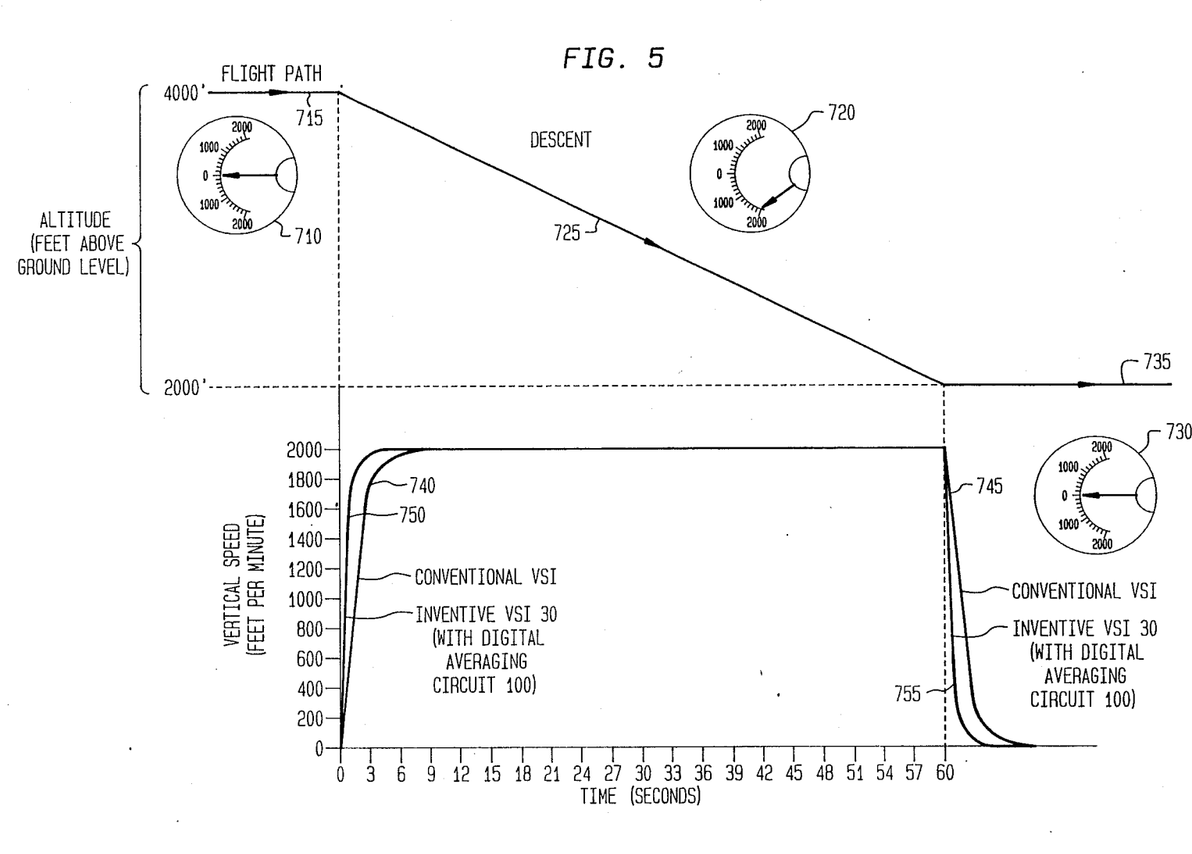
FIG. 5 is a chart showing the relative response times of inventive VSI 30, incorporating digital averaging circuit 100, and the conventional mechanical VSI known in the art and typified by that shown in FIG. 1 for a descent of 2000 feet per minute.

FIG. 5 is a chart showing the relative response times of inventive VSI 30, incorporating digital averaging circuit 100, and the conventional mechanical VSI known in the art and typified by that shown in FIG. 1 for a descent of 2000 feet per second. For purposes of illustration, response times are given for an aircraft that is flying along a flight path that contains level flight at 4000 feet above ground level (AGL) symbolized by line 715 and a zero reading on VSI face 710, a descent portion at a 2000 fpm rate to 2000 feet AGL symbolized by line 725 and an indicated downward vertical speed of 2000 fpm on VSI face 720, and finally followed by a level flight portion at 2000 feet AGL as symbolized by line 735 and a zero reading on VSI face 730. A conventional mechanical aneroid VSI has a response typified by curves 740 and 745; while the inventive VSI with digital averaging circuit 100 has a response given by lines 750 and 755. As is evident from this chart, the inventive VSI using digital averaging circuit 100 advantageously has a significantly faster response than the conventional VSIs known in the art.

Even though the digital averaging circuit has been shown as being fabricated from discrete digital devices, these devices can be readily replaced by an appropriately programmed general purpose microprocessor or specialized digital processing circuit.

Although one embodiment of the present invention and a variant thereof have been shown and described herein, clearly those skilled in the art by now realize that many other varied embodiments of a vertical speed indicator can be readily constructed that still incorporate the teachings of the present invention.

I claim:

1. An electronic vertical speed indicator for use in an aircraft comprising:

a substantially rigid hollow closed air chamber;

means connected to said chamber for routing atmospheric air from an aircraft static system into said chamber and for imparting a pre-defined amount of pneumatic resistance to air flow occurring between said static system and said chamber;

a differential pressure transducer having two inlet ports;

first means connected between said chamber and one of said ports of said transducer for exposing said one port to air pressure occurring within said chamber;

second means connected to the other one of said ports for exposing said other port to atmospheric pressure occurring within said static system; and means, connected to said transducer and responsive to an electronic signal produced thereby, for providing an indication of vertical speed of said aircraft, wherein said indication providing means comprises:

means for amplifying said signal by a pre-defined amount to produce an amplified signal;

means, responsive to said amplified signal, for varying the phase thereof in a leading direction so as to produce a compensated signal wherein at least a partial amount of pneumatic induced lag inherent therein is offset;

means, responsive to said compensated signal, for digitally averaging the compensated signal over a pre-defined time period so as to produce an averaged signal;

means, responsive to said compensated signal, for varying the time period over which said digital average is from 0.05 seconds to 0.3 seconds as said vertical speed varies between 200 feet/minute to 500 feet/minute; and means for displaying said averaged signal as said vertical speed indication.

2. The vertical speed indicator in claim 1 wherein said routing means comprises a bleed hole or a conduit having a reduced inside diameter at a pre-defined position along its length.

3. The vertical speed indicator in claim 1 wherein said first and second exposing means are connected through a common manifold to the aircraft static system.

4. The electrical speed indicator in claim 1 wherein the transducer comprises a piezoresistive device.

5. An electronic vertical speed indicator for use in an aircraft comprising:

a substantially rigid hollow closed air chamber;

means connected to said chamber for routing atmospheric air from an aircraft static system into said chamber and for imparting a pre-defined amount of pneumatic resistance to air flow occurring between said static system and said chamber;

a differential pressure transducer having two inlet ports;

first means connected between said chamber and one of said ports of said transducer for exposing said one port of air pressure occurring within said chamber;

second means connected to the other of said ports for exposing said other port to atmospheric pressure occurring within said static system; and means, connected to said transducer and responsive to an electronic signal produced thereby, for providing an indication of vertical speed of said aircraft, wherein said indication providing means comprises:

means for amplifying said signal by a pre-defined amount to produce an amplified signal;

means, responsive to said amplified signal, for varying the phase thereof in a leading direction so as to produce a compensated signal wherein at least a partial amount of pneumatic induced lag inherent therein is offset;

means, responsive to said compensated signal, for digitally averaging the compensated signal over a pre-defined time period so as to produce an averaged signal, wherein said digital averaging means comprises:

means for sampling said compensated signal to yield corresponding digital signal representations thereof;

means, operative in response to said digital signal representations, for converting each of said digital signal representations into a corresponding series of pulses, wherein the number of pulses in said corresponding series is defined by the value of an associated one of said digital representations;

means, responsive to said pulse series, for accumulating the total number of individual pulses in every one of said pulse series that occurs during said time period in order to produce a totalized value;

means for dividing the totalized value by a pre-defined number to generate an average value which equals the average number of pulses occurring in said every one of said series during said period;

means for converting said average value to a form suitable for display; and means, connected to said dividing means and to said accumulating means, for resetting both said average value to a first pre-defined value and said totalized value to a second pre-defined value after said average value has been applied to said converting means;

means, responsive to said compensated signal, for proportionally varying said time period between pre-defined minimum and said maximum time periods in response to variations in said vertical speed occurring between pre-defined minimum and maximum pre-defined amounts; and means for displaying said averaged signal as said vertical speed indication.

6. The vertical speed indicator in claim 5 wherein said digital signal to pulse series converting means comprises:

a first binary counter that is loaded with the value of said digital signal representation and thereafter is continuously decremented by a source of gated clock pulses until the contents of said first counter reach zero; and gating means, responsive to the contents of said first counter and to a source of clock pulses, for producing said gated clock pulses as along as the contents of said first counter are greater than zero, wherein the gated clock pulses applied to said first counter form said corresponding pulse series such that the number of individual pulse that form said corresponding pulse series is equivalent to the value of said digital signal representation.

7. The vertical speed indicator in claim 6 wherein said accumulating means comprises a second binary counter.

8. The vertical speed indicator in claim 7 wherein said dividing means further comprises a third binary counter that has an output that is read in parallel when the pre-defined time period has elapsed.

9. The vertical speed indicator in claim 8 wherein said second and third binary counters are both reset to zero after the output of said third binary counter has been read.

10. The vertical speed indicator in claim 9 wherein said clock pulses are produced by a voltage controlled oscillator, and said time period lengthening means comprises:

means, responsive to said compensated signal, for producing a voltage that proportionally varies between first and second values whenever said vertical speed varies between said first and second pre-defined amounts; and means for applying said voltage to said voltage controlled oscillator so as to proportionally vary the frequency of said clock pulses.

11. The vertical speed indicator in claim 10 wherein said first pre-defined amount is 200 feet/minute and said pre-defined minimum time period is 0.05 seconds, and said second pre-defined amount is 500 feet/minute and said pre-defined maximum time period is 0.3 seconds.

12. The vertical speed indicator in claim 5 wherein said routing means comprises a bleed hole or a conduit having a reduced inside diameter at a pre-defined position along its length.

13. The vertical speed indicator in claim 5 wherein said first and second exposing means are connected through a common manifold to the aircraft static system.

14. The vertical speed indicator in claim 5 wherein the transducer comprises a piezoresistive device.

* * * * *